United States Patent [19]

Noda et al.

[11] Patent Number: 4,776,010

[45] Date of Patent: Oct. 4, 1988

[54] POWER SUPPLY CONTROL CIRCUIT IN SUBSCRIBER'S TERMINAL FOR CONTROL UNIT IN SUBSCRIBER'S COMMUNICATION SYSTEM

[75] Inventors: Kouji Noda; Kiyoshi Miura, both of Fukaya, Japan

[73] Assignee: Kabushiki Kaisha Toshiba, Kawasaki, Japan

[21] Appl. No.: 809,178

[22] Filed: Dec. 16, 1985

[30] Foreign Application Priority Data

Dec. 19, 1984 [JP] Japan .................. 59-266361

[51] Int. Cl.⁴ .................. H04N 7/16; H04N 7/10; H04H 1/02
[52] U.S. Cl. .................. 380/10; 358/86; 455/6
[58] Field of Search ............ 358/114, 115, 122, 123, 358/349, 84, 86; 455/229, 2, 6, 9; 380/10, 16, 20, 7

[56] References Cited

U.S. PATENT DOCUMENTS

| | | | |
|---|---|---|---|
| 3,303,279 | 2/1967 | Tinklepaugh | 358/115 |
| 3,541,453 | 11/1970 | Vandepoel et al. | 455/229 |
| 3,643,167 | 2/1972 | Mayle | 455/229 |
| 3,811,090 | 5/1974 | Uchida et al. | 455/229 |
| 3,839,676 | 10/1974 | Linnecar | 455/229 |
| 4,161,751 | 7/1979 | Ost | 358/114 |
| 4,173,024 | 10/1979 | Miller | 358/115 |
| 4,241,450 | 12/1980 | Blatter et al. | 455/229 |
| 4,348,696 | 9/1982 | Beier | 358/114 |
| 4,447,828 | 5/1984 | den Toonder | 358/114 |
| 4,467,353 | 8/1984 | Citta et al. | 358/114 |
| 4,566,033 | 1/1986 | Reidenouer | 358/115 |

FOREIGN PATENT DOCUMENTS 2310885 9/1974 Fed. Rep. of Germany .
59-225647 12/1984 Japan .

*Primary Examiner*—Stephen C. Buczinski
*Assistant Examiner*—Linda J. Wallace
*Attorney, Agent, or Firm*—Cushman, Darby & Cushman

[57] ABSTRACT

A subscriber's terminal is connected by a cable to a control unit, which is connected to a central station by a cable. The subscriber's terminal has a voltage supply source for supplying power to the control unit through the cable. The subscriber's terminal detects a communication carrier from the control unit by a demodulator. Based on the detection result, the presence/absence of an abnormality such as disconnection of the cable, malfunction of the control unit, etc. is detected so as to control a relay arranged along the cable between the voltage supply source and the control unit. When the abnormality occurs in the cable or the control unit, power supply to the control unit is stopped, thus preventing electric shock accidents and noise interference.

16 Claims, 3 Drawing Sheets

POWER SUPPLY CONTROL CIRCUIT IN SUBSCRIBER'S TERMINAL FOR CONTROL UNIT IN SUBSCRIBER'S COMMUNICATION SYSTEM

BACKGROUND OF THE INVENTION

The present invention relates to a power supply control circuit and, more particularly, to a power supply control circuit for stopping power supply to a control unit provided between a central station and a plurality of subscriber's terminals in a cable television (CATV) system and for controlling the subscriber's terminals when in abnormal states such as when a power supply cable having both power supply and signal transmission functions to the control unit is disconnected, or when the control unit malfunctions.

As a communication system using transmission cables, an urban CATV system for allowing bidirectional communication between a subscriber's terminals and a central station is known. In CATV systems including urban CATV, the power for the control unit provided between the subscriber's terminals and the central station is paid for by the subscribers. The control unit processes subscription data and performs transmission control thereof in the polling mode from the central station. The control unit also controls data transmission from the central station to the subscriber's terminal. Thus, the control unit performs bidirectional data transmission control.

In other words, communication between the central station and the subscriber's terminals is conducted in two stages (i.e., between the central station and the control unit, and between the control unit and the subscriber's terminals). For data transmission from subscriber's terminals to the central station, transmission data is temporarily stored in the control unit. The stored data is accumulated by the central station after performing polling. When data is to be supplied from the central station to the subscriber's terminals, data is temporarily distributed to the control unit and then sent to the subscriber's terminals. Thus, in an urban CATV system, upstream and downstream data control is performed with high efficiency.

In the above urban CATV system, subscriber's terminals are connected to control units through cables. These control units are also connected to the central station through cables. Each control unit is connected to a plurality of subscriber's terminals, and the central station is connected to a plurality of control units. Thus, a large number of subscribers can be accommodated.

Television signals and transmission data from the central station is supplied to subscriber's terminals through the control unit and cable, as described above. In the subscriber's terminal, the transmission data is demodulated by a demodulator and is then fetched by a control circuit as control data. Downstream data is control data from the control unit regarding, for example, whether or not a certain subscriber is authorized, e.g., in a pay system. In accordance with the control data, the given television signal is supplied to the television receivers of authorized subscribers. As for upstream data, however, when a subscriber inputs by key pads channel information about what he wants to watch, the information is modulated by a modulator upon control by the control circuit and is then transmitted to the control unit as channel data. At this time, the control unit determines whether the channel data indicates a subscribed channel. The determination is transmitted to the modulator, and the control circuit performs the predetermined control.

In such an urban CATV system, power is supplied to the control unit not from the central station but from the subscriber's terminal side. Since the central station is relatively distant from the control unit, the control unit may be incorrectly powered and malfunction due to power tranmission loss. For this reason, power is supplied to the control unit by the subscriber's power source In this case, a voltage of about 60V is normally supplied to the control unit.

In an urban CATV system, the control unit is normally installed outdoors, and it is often installed near houses. Therefore, when the power supply cable to the control unit is disconnected, an electric shock accident may occur. When the control unit malfunctions, it may transmit noise and mix up data being sent from another control unit to the central station. Therefore, in this case, it is desirable that the power supply to malfunctioning control units be stopped immediately.

SUMMARY OF THE INVENTION

The present invention has been developed in consideration of the above situation, and has as its object providing a power supply control circuit which detects disconnection of a power supply cable to a control unit, malfunction of the control unit, etc., and stopping power supply from a subscriber's side to the control unit in accordance with the detection result so that electric shock accidents can reliably be prevented.

According to the invention, there is provided a power supply control circuit for use in a subscriber's communication system comprising a central station, a subscriber's terminal and data transmission control unit connected between the central station and subscriber's terminals by data transmission cable for controlling the data transmission therebetween. The power supply control circuit is to be installed in the subscriber's terminal to control the power supply from the terminal to the control unit. The power supply control circuit comprises:

power supply means for supplying power to the control unit through the data transmission cable;

detecting means for detecting the presence of a carrier component of a transmission signal sent from the control unit through the data transmission cable; and switching means provided along the data transmission cable between the power supply means and the control unit and controlled by the detecting means, the switching means functioning to stop the power supply to the control unit when the carrier is not detected by the detecting means.

DETAILED DESCRIPTION OF THE PREFERRED EMBODIMENT

Figure 1:
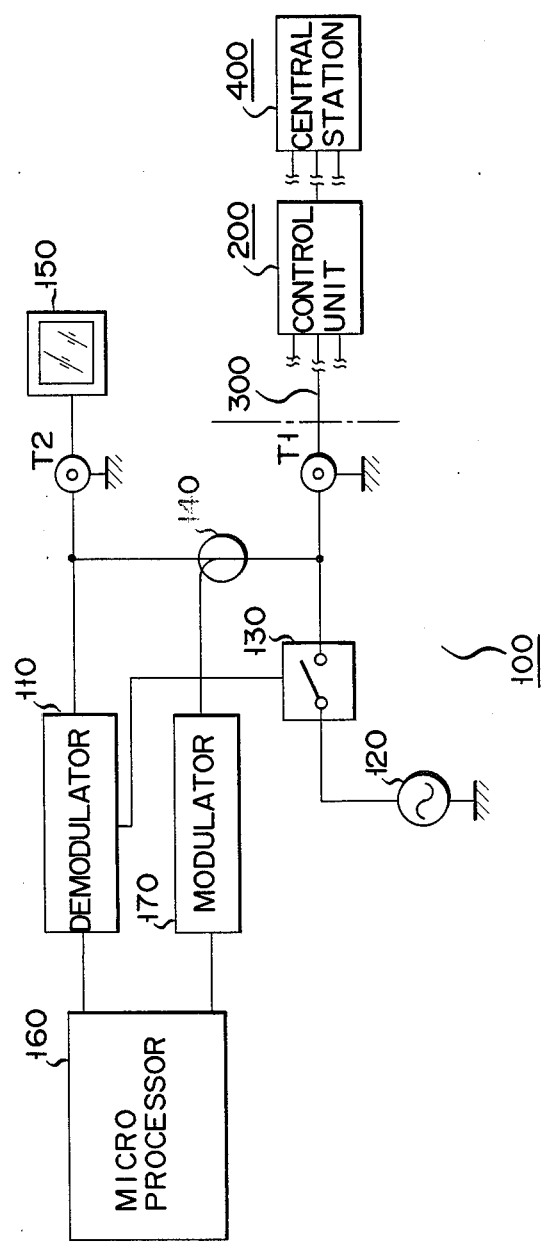
FIG. 1 is a block diagram showing a schematic arrangement of the present invention.

An embodiment of the present invention will be described hereinafter with reference to the accompanying drawings. FIG. 1 is a block diagram showing a power supply control circuit, e.g., in a CATV system. Referring to FIG. 1, a subscriber's terminal 100 is connected to control unit 200 through cable 300. Unit 200 is connected to central station 400 through a cable. Terminal 100 detects a communication carrier from unit 200 using demodulator 110 and determines the presence/absence of an abnormality from the detection result, thus controlling relay 130 connected to voltage supply source 120. When an abnormality occurs in cable 300 or unit 200, the power supply to unit 200 is stopped, thereby preventing electric shock accidents and noise interference.

It should be noted that, in FIG. 1, communication data from unit 200 is distributed to demodulator 110 for demodulating the communication data by bidirectional coupler 140 through terminal T1. Similarly, a television signal from unit 200 is supplied by coupler 140 through terminal T2 via terminal T1. Data to be sent from terminal 100 to unit 200 is generated by modulator 170 under the control of microprocessor 160. The data from modulator 170 is sent to unit 200 through coupler 140 and terminal T1.

Figure 2:
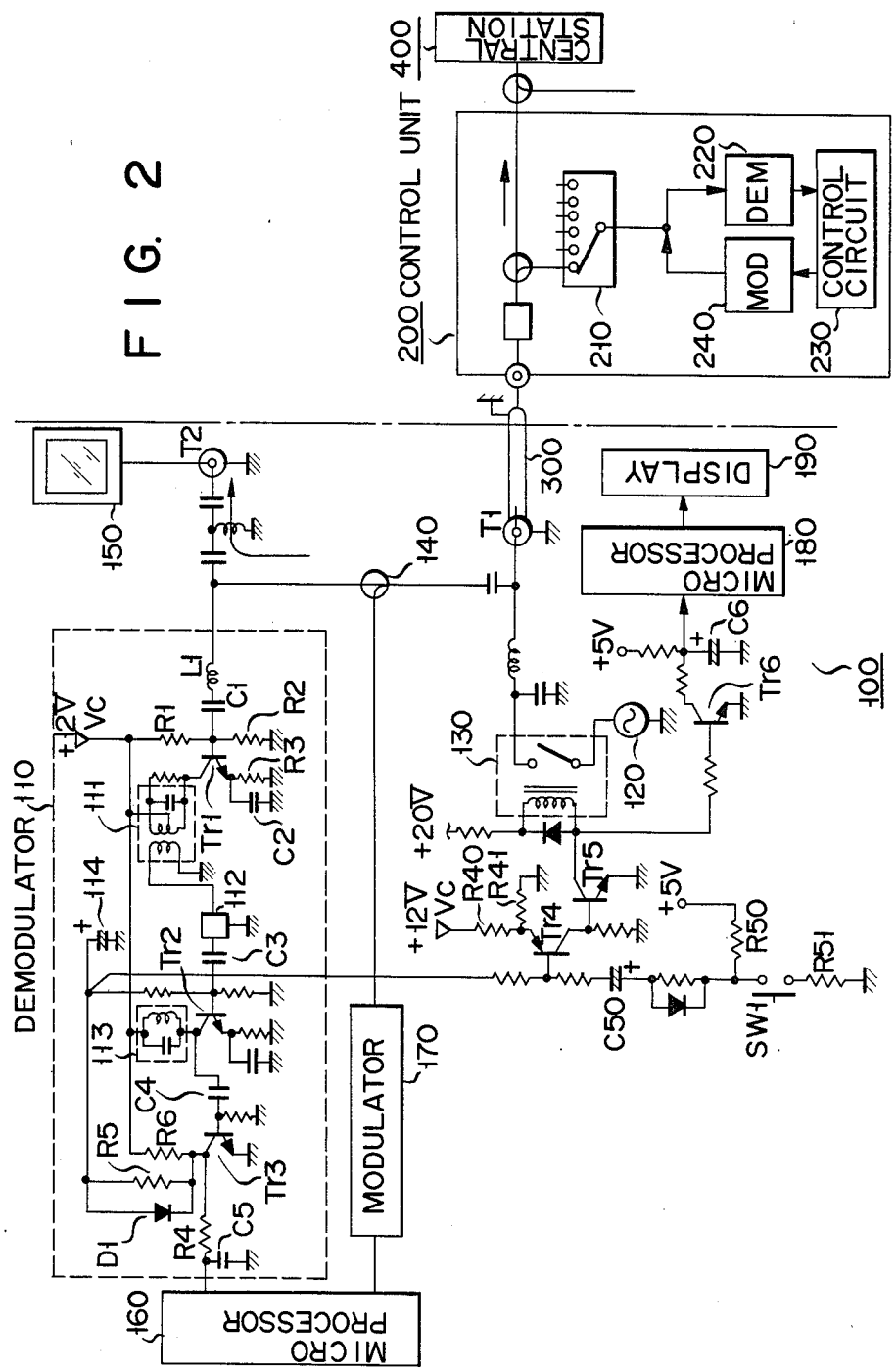
FIG. 2 is a block circuit diagram showing the arrangement of FIG. 1 in more detail.

The embodiment will be described in more detail with reference to FIG. 2. The reference numerals in FIG. 2 are the same as those of the corresponding parts in FIG. 1. Power is supplied to unit 200 from voltage source 120. Power supply from source 120 to unit 200 through cable 300 is controlled by the switching operation of relay 130. The switching operation of relay 130 is performed by the data transmission carrier used in data communication between unit 200 and terminal 100.

Data communication between unit 200 and terminal 100, e.g., from unit 200 to terminal 100, is performed utilizing an ASK wave at 410 KHz. Conversely, data communication from terminal 100 to unit 200 is performed utilizing an ASK wave at 468 KHz. In this case, the data transmission rate is about 1,320 baud. A case will be now be described wherein the AM modulation factor is 100%

In this embodiment, the presence/absence of an abnormality in cable 300 or unit 200 is detected by the presence/absence of the data carrier used for transmitting data from unit 200 to terminal 100. Data is bidirectionally transferred between terminal 100 and unit 200. For instance, the data representing the channel requested by a subscriber is transmitted from terminal 100 to unit 200, and the data indicating that the requested channel is a subscribed one is transmitted from unit 200 to terminal 100.

The request from the subscriber is supplied to unit 200 through cable 300. Single unit 200 controls a plurality (e.g., 6) of subsriber's terminals. In this case, multiplexer 210 of unit 200 performs polling of the subscriber's terminal and retrieves the request data from the terminal. The retrieved data is demodulated by demodulator 220, and is subjected to predetermined processing by control circuit 230 comprising a microcomputer, and the like. Circuit 230 discriminates the request data from the subscriber then determines the data to be returned to the corresponding subscriber and supplies the data to modulator 240. The data is modulated by modulator 240, and is then sent back to corresponding terminal 100 through multiplexer 210. The modulated data is an ASK wave obtained by AM-modulating a continuous carrier at 410 KHz by a transmission signal. The ASK wave is transmitted to terminal 100 through cable 300, which also serves as a power supply cable. Therefore, when the presence/absence of the carrier is detected, the abnormality such as disconnection of cable 300 or malfunction of unit 200 can be detected.

The relationship between data and the carrier supplied from unit 200 to terminal 100 is as follows. When data is set at level "1", the carrier is suppressed, and when data is set at level "0" or when no communication is performed, the carrier is generated.

Assuming that data communication is not performed, the carrier at 410 KHz transmitted from unit 200 is supplied to coupler 140 through cable 300 serving as a power supply cable. The carrier supplied to coupler 140 is supplied to demodulator 110.

In demodulator 110, the 410 KHz carrier component is extracted by a resonance circuit comprising L1 and C1 having a resonance frequency of 410 KHz. The extracted carrier component is amplified by transistor Tr1. The base of transistor Tr1 is biased by a voltage obtained by dividing a +12-V voltage by the series circuit of resistors R1 and R2. A parallel circuit of resistor R3 and capacitor C2 is connected to the emitter of transistor Tr1. The collector of transistor Tr1 is connected to tuning circuit 111, which amplifies the 410 KHz carrier component. Any unnecessary frequency signal contained in the amplified carrier signal component is removed by filter 112, which is a piezoelectric filter (e.g., a ceramic filter having excellent frequency selectivity). The carrier signal without the unnecessary frequency component is supplied to the base of transistor Tr2 through capacitor C3, and thereby further amplified. In this case, the collector of transistor Tr2 is connected to tank circuit 113 at 410 KHz. The amplified carrier signal is then supplied to the base of transistor Tr3 through capacitor C4. Transistor Tr3 performs Class B amplification to amplify the positive half cycle of the received carrier. A diode formed between the base and the emitter of transistor Tr3 performs the rectifying operation together with capacitor C4. Transmission data is thus demodulated from the 100% AM modulation ASK wave. The demodulated data obtained from the collector of transistor Tr3 is waveshaped by a low-pass filter formed by resistor R4 and capacitor C5 and is then supplied to control circuit 160 for processing.

In this case, transmission data from unit 200 may be attenuated by a long transmission cable. Therefore, in order to prevent data error due to this attenuation, automatic gain control (AGC) is performed by demodulator 110. The AGC operation is achieved such that the potential at the collector of transistor Tr3 is fed back to the base of transistor Tr2.

When the carrier signal is supplied, if the input level is high, the collector potential of transistor Tr3 decreases, and the terminal voltage of capacitor 114 is thus decreased. The base voltage of transistor Tr2 is decreased, and the gain is controlled, thus achieving negative feedback operation. When the output signal level from transistor Tr3 decreases, a negative feedback operation opposite the above operation is performed, and the AGC operation is performed based on the terminal voltage of capacitor 114. Thus, the AGC operation is performed based on the level of the carrier, and the presence/absence of the carrier can also be detected by utilizing the AGC voltage.

As noted above, the relationship between the modulation data and the carrier is such that when the modulation data is set at level "0", the carrier is sent, and when set at level "1", the carrier is suppressed. Normally, when communication between unit 200 and terminal 100 is not performed, the carrier is continuously generated. From this fact, the carrier detection failure corresponds to an abnormality such as disconnection of cable 300 or malfunction of unit 200. Therefore, when the carrier cannot be detected, it is known that an abnormality has occurred. If the power supply is thus stopped in such cases, electrical shock accidents and noise interference can be prevented.

As described above, detection of the carrier utilizes the AGC voltage appearing as the terminal voltage of capacitor 114. In other words, power supply control from voltage source 120 is performed based on the AGC voltage level. This power supply control is described below.

The AGC voltage across the terminals of capacitor 114 is applied as the base voltage of transistor Tr4. The voltage obtained by dividing the +12-V voltage from power source Vc by resistors R40 and R41 is applied to the emitter of transistor Tr4. When the AGC voltage of capacitor 114 is low compared to the divided voltage, transistor Tr4 becomes conductive. Transistor Tr5 then becomes conductive. When transistor Tr5 is turned on, the energizing current flows through relay 130 to turn it on. Thus, power from voltage source 120 is supplied to unit 200 through cable 300.

In other words, when cable 300 is connected between unit 200 and terminal 100, if transmission data is at level "0", i.e., no data transmission is performed, maximum input is applied to transistor Tr3 since the data "0" corresponds to the 100% AM modulation carrier. The AGC voltage is thus decreased (to about 1 V), and the energizing current intermittently flows through relay 130. Therefore, power is intermittently supplied to unit 200 from voltage source 120.

When an abnormality occurs, e.g., disconnection of cable 300 connecting terminal 100 and unit 200, malfunction of unit 200, etc., transistor Tr3 is disabled, and its collector potential increases (to about 6V). In this case, the terminal voltage of capacitor 114 becomes higher than the voltage obtained by dividing the voltage (12 V) from source Vc by resistors R40 and R41. Therefore, transistors Tr4 and Tr5 are disabled, and the energizing current to relay 130 stops flowing. The power supply to unit 200 from voltage source 120 is thus interrupted. Even when the abnormality occurs during power supply, electric shock accidents and noise interference can be prevented.

Figure 3:
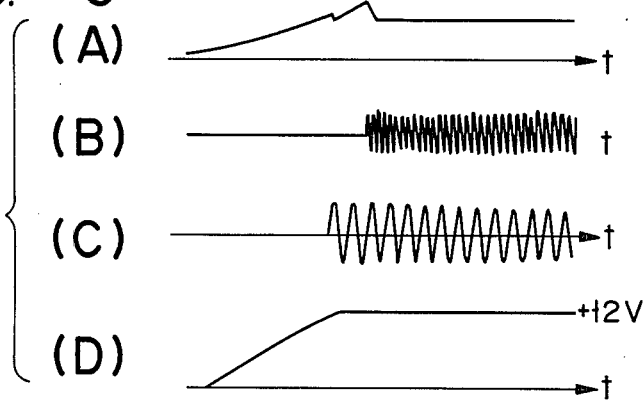
FIGS. 3 to 5 are waveform charts at points in FIG. 2 when power supply is initiated, abnormality occurs, and power supply is resumed, respectively.
Figure 4:
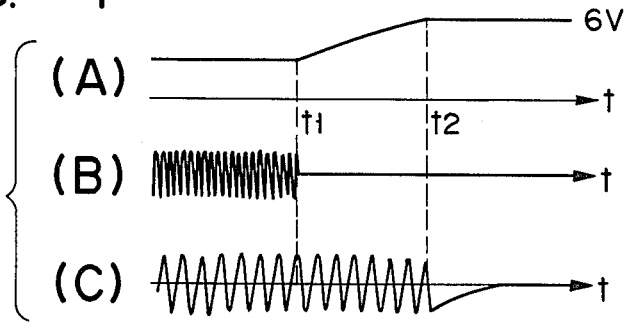
Figure 5:
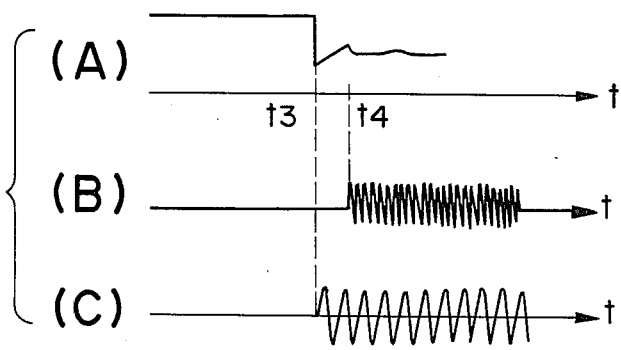

FIGS. 3 to 5 show (A) the AGC voltage as the terminal voltage of capacitor 114, (B) the transmission carrier from unit 200, and (C) the power supply voltage, when the power is on, when an abnormality occurs, and when the power supply is resumed, respectively.

FIG. 3 shows a state wherein a subscriber has inserted the AC plug (not shown) of terminal 100 into a receptacle, and turned it on. When the power is on, a time constant determined by resistors R5 and R6 and the capacitance of capacitor 114 is set high with respect to rising characteristics of voltage source Vc, shown in FIG. 3(D), for energizing demodulator 110 so that the rising characteristics of the AGC voltage shown in FIG. 3(A) are moderated. The base potential of transistor Tr4 is thus decreased with reference to the emitter potential thereof so as to turn on transistor Tr4. Relay 130 is then operated, and the AC voltage shown in FIG. 3(C) is supplied by source 120 through cable 300. When the data carrier shown in FIG. 3(B) is supplied from unit 200, the AGC voltage basically becomes constant.

As long as the data carrier is detected by transistor Tr4, the power supply is maintained.

FIG. 4 shows the waveforms when the aforementioned abnormality occurs. When the power supply to cable 300, which is maintained by the ON state of transistor Tr4 based on the presence of the data carrier, is interrupted at time t1 due to the abnormality, no data carrier is detected in FIG. 4(B), and transistor Tr3 is turned off. The AGC voltage as the terminal voltage of capacitor 114 increases, as shown in FIG. 4(A). When the AGC voltage reaches about 6V at time t2, transistor Tr4 is turned off by an increase in the base potential of transistor Tr4. For this reason, relay 130 is disabled, and power supply by source 120 is stopped at time t2, as shown in FIG. 4(C).

The case will now be described wherein after the above abnormality has been recovered, the power supply from terminal 100 to unit 200 is resumed. Immediately before the power supply is resumed, since no data carrier is supplied to demodulator 110, the terminal voltage of capacitor 114 is high, as shown in FIG. 5(A), and transistors Tr4 and Tr5 are disabled. When resume switch SW1 is depressed at time t3, a +5-V voltage is supplied to a series circuit of resistors R50 and R51, and capacitor C50 is discharged. At time t3, the terminal voltage of capacitor 114 is abruptly decreased. Transistors Tr4 and Tr5 for driving relay 130 are thus rendered conductive, the drive current flows through relay 130, and power supply is resumed, as shown in FIG. 5(C). The data carrier is then sent from unit 200, and is detected at time t4, as shown in FIG. 5(B). Based on the data carrier, an AGC loop, formed by a feedback path from the collector of transistor Tr3 to the base of transistor Tr2, is operated, and the terminal voltage of capacitor 114 as the AGC voltage is kept at a level sufficient to enable transistor Tr4, as long as the carrier is detected. For this reason, the power supply to unit 200 can be maintained. The time constant of the AGC operation for detecting the carrier is virtually determined by capacitor 114, resistor R5 and diode D1.

As described above, the presence/absence of the carrier is detected by utilizing the AGC voltage so as to control the power supply with respect to unit 200 on the terminal 100 side. During data communication, the carrier may be suppressed. In this case, since the data length is sufficiently shorter than the response speed of the power supply control circuit, there is no serious problem.

When the aforementioned abnormality occurs, transistor Tr5 is turned off, and the energizing current does not flow through relay 130, as described above. The base potntial of transistor Tr6, whose base is connected to the collector of transistor Tr5, increases, and transistor Tr6 is rendered conductive. At this time, the charge on capacitor C6 is discharged by turning on transistor Tr6, and the collector potential of transistor Tr6 decreases. Microprocessor 180 for controlling terminal 100 is reset upon detection of a decrease in the collector potential of transistor Tr6 when the abnormality occurs. If display 190 is driven in response to the reset pulse, occurrence of the abnormality can be signalled to the subscriber.

As described above, according to the present invention, when a signal transmission cable connecting a subscriber's terminal and a control unit also serves as a power supply cable, the power supply can reliably be stopped upon detecting the abnormality such as disconnection of the cable, malfunction of the control unit, etc. Therefore, a power supply control circuit, which can prevent electric shock accidents and noise interference, can be provided. In the above embodiment, the data carrier is used as the means of abnormality detection. However, a carrier for monitoring a trunk cable can also be transmitted/received in addition to the data carrier.

What is claimed is:

1. A power supply control circuit for use in a subscriber's communication system including a central station, a plurality of subcribers, terminals and a plurality of data transmission control units, each control unit being connected between the centrol station and separately connected to several subscribes' terminals by respective data transmission cables, one for each subscriber's terminal, each said control unit controlling bidirectional data transmission between the central station and each subscriber's terminal connected thereto by said respective data transmission cables, said power supply control circuit being installed in each subscriber's terminal to control the power supply from each subscriber's terminal a corresponding control unit over the respective data transmission cable separately connecting said corresponding control unit to each subscriber's terminal and comprising:

power supply means for supplying power to said corresponding control unit through a particular data transmission cable connecting said corresponding control unit to said power supply control circuit;

detecting means for detecting the presence/absence of a carrier component of a transmission signal sent from said corresponding control unit through said particular data transmission cable; and switching means, provided along said particular data transmission cable between said power supply means and said corresponding control unit and controlled by said detecting means, for stopping the power supply to said corresponding cotrol unit when said carrier component is not detected by said detecting means.

2. A circuit according to claim 1, wherein said carrier component of the transmission signal sent from said corresponding control unit is suppressed when data transmission is performed between said corresponding control unit a subscriber's terminal including said power supply control circuit, and is not suppressed when data transmission is not performed between said corresponding control unit and the subscriber's terminal.

3. A circuit according to claim 2, wherein said detecting means is a data demodulation means comprising filter means for extracting the carrier, amplifier means for amplifying the extracted carrier, Class B amplifier means for amplifying the positive half cycle of the amplified carrier, smoothing means for smoothing the output from said Class B amplifier means to obtain demodulation data, and automatic gain control (AGC) means for feeding back the output potential of said Class B amplifier means to the input side of said amplifier means so as to automatically control the gain of said amplifier means in accordance with the level of the extracted carrier, said switching means being controlled by said AGC means.

4. A circuit according to claim 3, wherein said amplifier means is an NPN transistor amplifier with a base connected to said filter means, a collector connected to a voltage source, and an emitter grounded through a parallel circuit consisting of a resistor and a capacitor; said Class B amplifier means is a class B NPN transistor amplifier with a base connected to a collector of said NPN transistor amplifier, a collector connected to said voltage source and said smoothing means, and an emitter which is grounded; said AGC means feeds back the collector potential of said Class B NPN transistor amplifier to the base of said NPN transistor amplifier through a resistor; and an AGC operation and control of said switching means are performed based on the terminal voltage of a capacitor charged by the collector potential of said Class B NPN transistor amplifier.

5. A circuit according to claim 4 wherein said switching means comprises a drive circuit controlled by the terminal voltage of said capacitor, and a relay driven by said drive circuit.

6. A circuit according to claim 5 wherein said drive circuit supplies an energizing current through said relay when the terminal voltage of said capacitor is lower than a predetermined voltage.

7. A circuit according to claim 6, wherein said drive circuit comprises a PNP transistor, in which the terminal voltage of said capacitor is applied to its base and the predetermined voltage is applied to its emitter, and an NPN transistor with a base connected to the collector of said PNP transistor, a collector connected to an energization coil of said relay connected to a voltage source, and an emitter which is grounded.

8. a circuit according to claim 7 further comprising means for signalling a power supply state to said control unit in accordance with the ON state of said NPN transistor.

9. A circuit according to claim 2, which further comprises power supply resuming means for resuming power supply to said corresponding control unit after the power supply has been interrupted said carrier component was not detected by said detecting means.

10. A circuit according to claim 9, wherein said detecting means is a data demodulation means comprising filter means for extracting the carrier, amplifier means for amplifying the extracted carrier, Class B amplifier means for amplifying the positive half cycle of the amplified carrier, smoothing means for smoothing the output from said Class B amplifier means to obtain demodulation data, and automatic gain control (AGC) means for feeding back the output potential of said Class B amplifier means to the input side of said amplifier means so as to automatically control the gain of said amplifier means in accordance with the level of the extracted carrier, said switching means being controlled by said AGC means.

11. A circuit according to claim 10, wherein said amplifier means is an NPN transistor amplifier with a base connected to said filter means, a collector connected to a voltage source, and an emitter grounded through a parallel circuit consisting of a resistor and a capacitor; said Class B amplifier means is a Class B NPN transistor amplifier with a base connected to the collector of said NPN transistor amplifier, a collector connected to said voltage source and said smoothing means, and an emitter which is grounded; said AGC means feeds back the collector potential of said Class B NPN transistor ampliier to the base of said NPN transistor amplifier through a resistor; and an AGC operation and control of said switching means are performed based on the terminal voltage of a capacitor charged by the collector potential of said Class B NPN transistor amplifier.

12. A circuit according to claim 11 wherein said switching means comprises a drive circuit controlled by the terminal voltage of said capacitor, and a relay driven by said drive circuit.

13. A circuit according to claim 12 wherein said drive circuit supplied an energizing current through said relay when the terminal voltage of said capacitor is lower than a predetermined voltage.

14. A circuit according to claim 13, wherein said drive circuit comprises a PNP transistor, in which the terminal voltage of said capacitor of is applied to its base and the predetermined voltage is applied to its emitter, and an NPN transistor with a base connected to the collector of said PNP transistor, a collector connected to an energization coil of said relay connected to a voltage source, and an emitter which is grounded.

15. A circuit according to claim 14 wherein said power supply resuming means comprises a capacitor charged by a predetermined voltage connected to the base of said PNP transistor and a switch for discharging said capacitor, the base potential of said PNP transistor being decreased due to the discharging operation.

16. A circuit according to claim 15 further comprising means for signalling a power supply state to said control unit in accordance with the ON state of said NPN transistor.

* * * * *